UNITED STATES PATENT OFFICE.

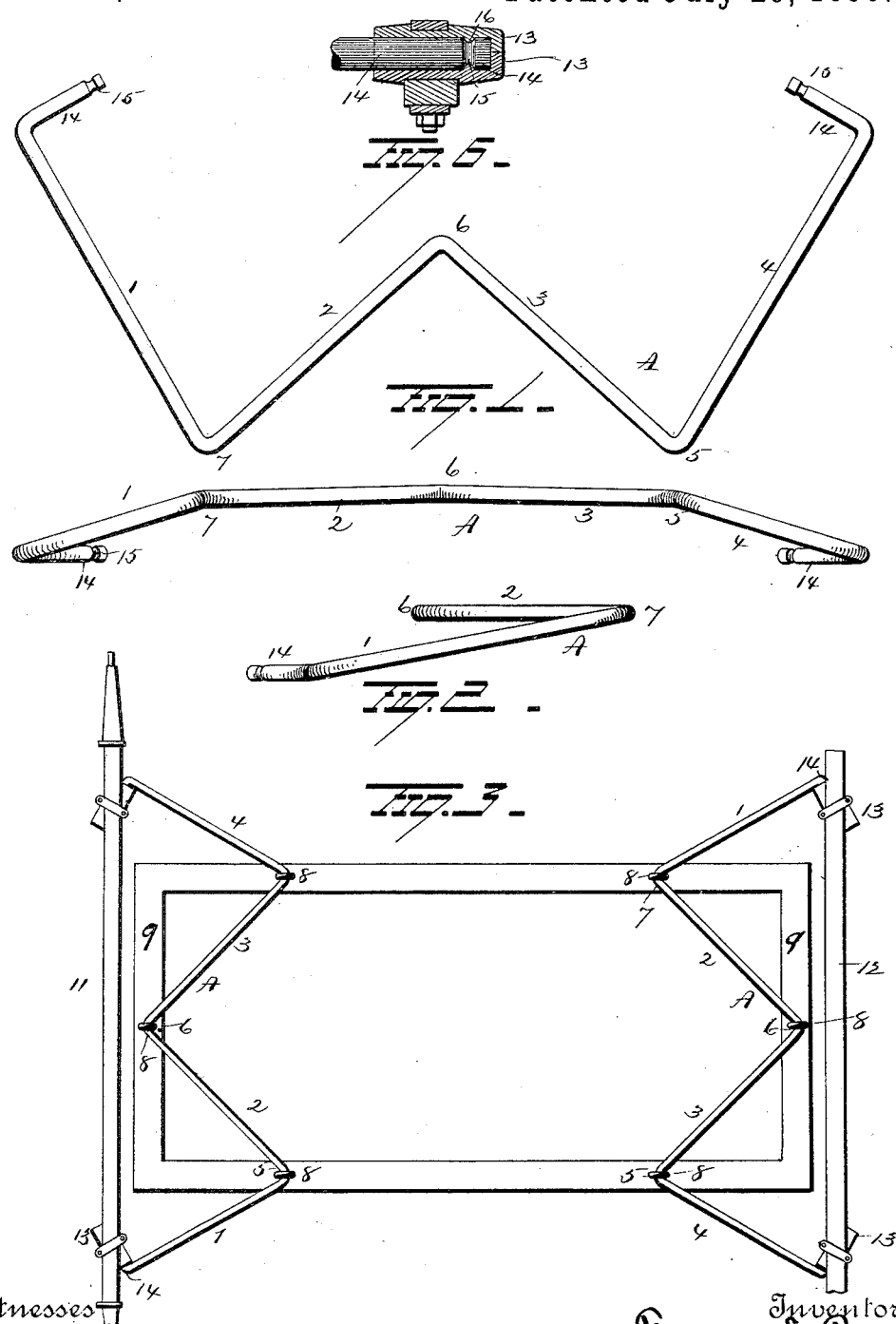

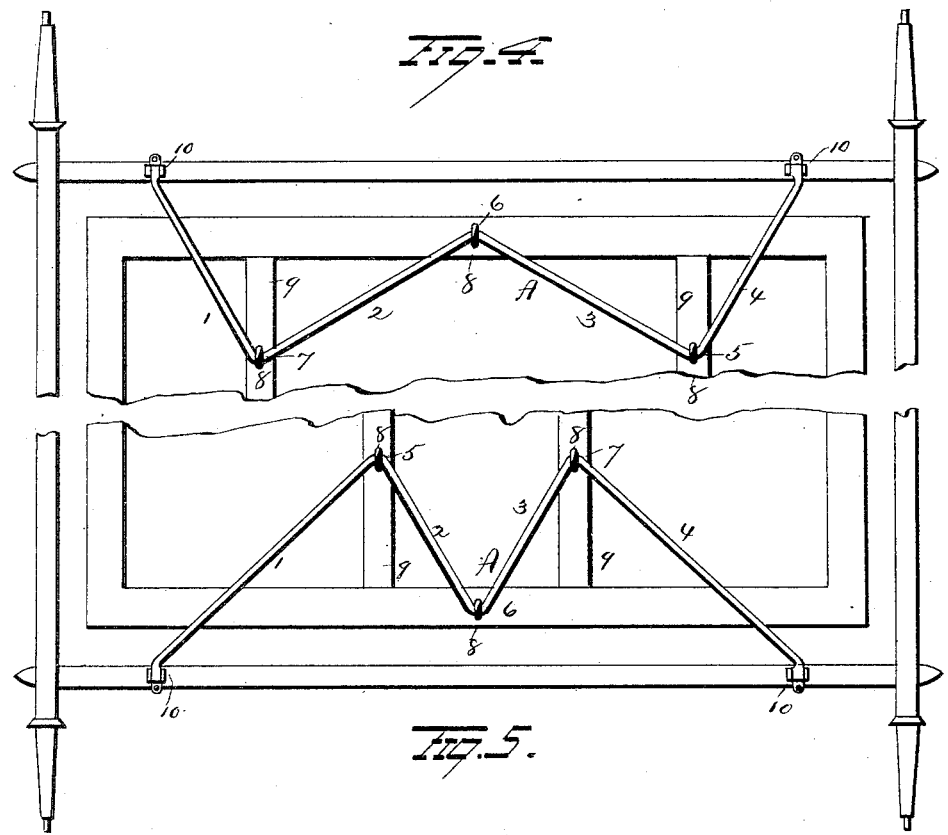

FRANCIS L. PERRY, OF BROOKLYN, NEW YORK.

VEHICLE-SPRING.

SPECIFICATION forming part of Letters Patent No. 433,026, dated July 29, 1890.

Application filed November 23, 1889. Serial No. 331,299. (No model.)

*To all whom it may concern:*

Be it known that I, FRANCIS L. PERRY, of Brooklyn, in the county of Queens and State of New York, have invented certain new and useful Improvements in Vehicle-Springs; and I do hereby declare the following to be a full, clear, and exact description of the invention, such as will enable others skilled in the art to which it appertains to make and use the same.

My invention relates to an improvement in vehicle-springs, and particularly to such as are known as "torsion-springs," the object being to provide a light, cheap, and simple spring applicable to different forms of vehicles, and one in which strength and elasticity are combined, to the end that weight applied at various points in the body of the vehicle are equalized throughout the body, resulting not only in greater strength and durability, but also in increased comfort to the occupant of the vehicle.

With this object in view, my invention consists in a zigzag or W shaped spring and other connected features of construction and combinations of parts, as will be hereinafter described, and pointed out in the claims.

In the accompanying drawings, Figure 1 is a view in elevation of my improved spring. Fig. 2 is a view in end elevation of the same. Fig. 3 is a bottom plan view of a vehicle-body, showing one form of my improved spring applied thereto. Figs. 4 and 5 show different modes of application of the spring, and Fig. 6 is a sectional view of the bearing-box for the spring.

A represents the spring, which is preferably made of a single piece of metal, round in cross-section, for light vehicles. The bar forming the spring is made substantially W-shaped to form the straight portions or arms 1, 2, 3, and 4 and the bends 5, 6, and 7 between them. The inner arms 2 and 3, or V portion of the spring, is held horizontally beneath the lower surface of the body of the vehicle by means of loops or boxes 8 8, in which the bends 5, 6, and 7 have bearings. These loops or boxes are generally secured in the sills or cross-pieces 9 9, as shown on the lower surface of the box or body, and obviously the spring or springs, when applied to different sizes of vehicles, and especially to different lengths of boxes, are drawn out to increase the distance between the bends 5 and 7 for attachment nearer the ends of the body. This gives attachment to the body at three points at the least in every instance.

The outer arms 1 and 4 of the spring are by preference a little longer than the two inner arms 2 and 3, and they extend obliquely downward to a point where they are connected to the running-gear of the vehicle in any approved manner—as, for instance, by means of ordinary shackles 10 10, Figs. 4 and 5, or their equivalents. These springs are applicable either to two-wheeled or four-wheeled vehicles, and when applied to two-wheeled vehicles one spring only is required, whereas when the springs are applied to four-wheeled vehicles two are employed. These may be arranged for connection to side bars at their ends, and then the most convenient means of connection is by the shackles 10 10; or one spring may be attached at each end of the body, and then the outer ends of the arms 1 and 4 are connected with the rear axle 11, and the cross-bar 12 at the forward end, thus constituting draft-springs as well as torsion-springs, whereby the rear axle and front cross-bar are held to the body yieldingly, but are prevented from swinging or rocking, thus dispensing with the use of the ordinary reach through the middle. In this construction, in lieu of the shackles at the outer ends of the springs, two-part bearing-boxes 13 13 are clipped or otherwise secured to the axle and front cross-bar obliquely or at about right angles to the outer arms 1 and 4, and the outer ends of said arms are bent at about right angles to form round pintles 14 14, which enter and have bearings upon which to rock inside the sectional boxes 13 13. To keep these pintles in the boxes, nuts may be secured on their outer ends; or they may be upset at this point; or, better yet, an annular recess 15 may be formed in each pintle for the purpose of receiving a corresponding rib 16 in the bearing-box, which has the effect of retaining the pintles in the boxes, and yet allow them to rock freely.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. The combination, with a vehicle-body, of a W-shaped spring attached at the several bends thereof to said body, and running-gear, to which the outer ends of the spring are connected, substantially as set forth.

2. The combination, with the body and running-gear, of a W-shaped spring attached to the body at the bends and having pintles on its outer ends, and two-part boxes secured to the running-gear, and means for retaining the pintles in the boxes, substantially as set forth.

3. The combination, with a body and running-gear, of a W-shaped spring attached to the body at the bends and having pintles at the outer ends, and two-part bearing-boxes, between which the pintles are supported, said boxes having ribs therein which enter corresponding recess in the pintles to prevent endwise movement, substantially as set forth.

4. The combination, with a body, a rear axle, and front cross-bar or axle, of a pair of W-shaped springs attached to the body at the bends and to the axle or cross-bar at the ends, substantially as set forth.

5. The combination, with a body and axle, of a W-shaped spring attached to the body at the bends and having boxes secured diagonally to the axle and adapted to receive and form bearings for the outer ends of the spring, substantially as set forth.

In testimony whereof I have signed this specification in the presence of two subscribing witnesses.

FRANCIS L. PERRY.

Witnesses:
S. G. NOTTINGHAM,
G. F. DOWNING.